(12) United States Patent
Kiilerich Pratas et al.

(10) Patent No.: US 12,010,671 B2
(45) Date of Patent: Jun. 11, 2024

(54) METHOD FOR BEAM MANAGEMENT MEASUREMENTS

(71) Applicant: NOKIA TECHNOLOGIES OY, Espoo (FI)

(72) Inventors: Nuno Manuel Kiilerich Pratas, Gistrup (DK); Faranaz Sabouri-Sichani, Aalborg (DK); Laura Luque Sanchez, Nibe (DK); Devaki Chandramouli, Plano, TX (US); Jakob Lindbjerg Buthler, Aalborg (DK); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 107 days.

(21) Appl. No.: 17/449,744

(22) Filed: Oct. 1, 2021

(65) Prior Publication Data
US 2022/0110106 A1 Apr. 7, 2022

(30) Foreign Application Priority Data
Oct. 2, 2020 (FI) ...................................... 20205965

(51) Int. Cl.
*H04W 72/04* (2023.01)
*H04W 24/10* (2009.01)
(Continued)

(52) U.S. Cl.
CPC ......... *H04W 72/046* (2013.01); *H04W 24/10* (2013.01); *H04W 68/00* (2013.01); *H04W 88/06* (2013.01)

(58) Field of Classification Search
CPC ... H04W 72/046; H04W 24/10; H04W 68/00; H04W 88/06; H04W 16/28; H04W 72/54; H04W 4/12; H04B 7/0695; H04B 7/088
See application file for complete search history.

(56) References Cited

U.S. PATENT DOCUMENTS 10,623,946 B1 4/2020 Kumar et al.
2013/0150013 A1* 6/2013 Liu .................. H04W 8/183
455/418
(Continued)

FOREIGN PATENT DOCUMENTS

CN 105830483 A 8/2016
CN 109691219 B 9/2022
(Continued)

OTHER PUBLICATIONS

Office Action for Finnish Application No. 20205965, dated Dec. 23, 2020, 8 pages.
(Continued)

*Primary Examiner* — Mewale A Ambaye
(74) *Attorney, Agent, or Firm* — Brake Hughes Bellermann LLP

(57) ABSTRACT

An apparatus may include a processor and computer program code, and may be configured to cause the apparatus to allocate a radio transceiver for a communication of a first SIM and a second SIM for alternative active periods, wherein the first SIM is configured to at least monitor paging messages during its active periods and the second SIM is configured to perform beam management operations during its active periods; monitor a number of scheduled beam management operations of the second SIM skipped during the active periods of the radio transceiver allocated for the first SIM; determine, based on at least data from the performed beam management operations, a threshold value for the skipped beam management operations; and adjust, in response to the number of the skipped beam management operations reaching the threshold value, allocation of the active periods of the radio transceiver between the first SIM and the second SIM.

14 Claims, 8 Drawing Sheets

(51) Int. Cl.
*H04W 68/00* (2009.01)
*H04W 72/044* (2023.01)
*H04W 88/06* (2009.01)

(56) References Cited

U.S. PATENT DOCUMENTS

| | | | | |
|---|---|---|---|---|
| 2013/0150014 A1* | 6/2013 | Gong | ................... | H04W 48/18 |
| | | | | 455/418 |
| 2013/0150036 A1* | 6/2013 | Pattaswamy | .......... | H04W 76/15 |
| | | | | 455/435.1 |
| 2017/0208611 A1* | 7/2017 | Chincholi | ......... | H04W 72/1215 |
| 2017/0230932 A1 | 8/2017 | Challa et al. | | |
| 2017/0359772 A1 | 12/2017 | Lee | | |
| 2018/0077728 A1 | 3/2018 | Shi et al. | | |
| 2020/0107327 A1 | 4/2020 | Wang et al. | | |

FOREIGN PATENT DOCUMENTS

| | | | |
|---|---|---|---|
| WO | 2018035334 A1 | 2/2018 | |
| WO | 2018183995 A1 | 10/2018 | |
| WO | 2020112473 A1 | 6/2020 | |
| WO | 2020167857 A1 | 8/2020 | |
| WO | WO-2020167857 A1 * | 8/2020 | ........... H04B 7/0695 |

OTHER PUBLICATIONS

Pathak et al., "Protocol for Reduction in Network Resource Wastage for 4G Dual SIM Dual Standby User Equipment", 2018 15th IEEE Annual Consumer Communications & Networking Conference (CCNC); 2018, 4 pages.

European Search Report for Application No. 21199722.6, dated Feb. 24, 2022, 11 pages.

Office Action and Search Report for Chinese Patent Application No. 202111173082.6, mailed on Jan. 19, 2024, 9 pages.

\* cited by examiner

METHOD FOR BEAM MANAGEMENT MEASUREMENTS

CROSS-REFERENCE TO RELATED APPLICATIONS

This application claims priority to Finnish patent application No. 20205965, filed Oct. 2, 2020, entitled "METHOD FOR BEAM MANAGEMENT" which is hereby incorporated by reference in its entirety.

TECHNICAL FIELD

The present invention relates to beam management measurements.

BACKGROUND

Wireless devices with multiple subscriber identification module (SIM) cards, or USIMs (Universal SIMs), as referred to in 3GPP (so-called multi-(U)SIM (MUSIM) wireless device) have become increasing popular due to their ability to allow a user to use multiple service providers or subscriptions on the same device. Thus, the user may e.g. distinguish his/her business account and personal account on separate numbers and invoices and/or take advantage of different pricing schemes of the operators.

One type of multi-SIM wireless device, referred to as a dual-SIM dual active (DSDA) or Multi USIM Multi Active (MUMA) device, comprises two or more different transmission/reception (TX/RX) functionalities, i.e. one for each SIM, thereby allowing simultaneous active connections with the two or more networks corresponding to said SIMs. Another type of multi-SIM wireless device, referred to as a dual-SIM dual standby (DSDS) or Multi USIM Multi Standby (MUMS) device, is more prevalent on the market due to its less expensive and less power consuming single TX/RX functionality, which is shared by the SIMS.

In a DSDS device both SIMs, or more precisely the network subscriptions associated with the SIMs, may operate in idle mode, wherein both SIMs may receive, and therefore shall monitor for, paging messages using the shared RF resource. In addition, either of the SIMs may operate in connected mode and originate or terminate a communication (e.g., a voice call or data call). For enabling the communication, the SIM operating in connected mode must further carry out beam management operations with the network for ensuring sufficient quality of the used radio beams. For completing these tasks, the shared RF resources are allocated to both SIMS in alternating manner.

However, allocating the RF resources to both SIMS in alternating manner may lead to a situation, where the SIM operating in the connected mode may be forced to skip some scheduled beam management operations due to the RF resources being temporarily being allocated to the other SIM. This may cause the SIM in the connected mode to lose its beam alignment, whereupon a beam failure recovery (BFR) procedure needs to be started.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa; means for allocating a radio transceiver of the apparatus for a communication of the first SIM and the second SIM for alternative active periods, wherein the first SIM is configured to at least monitor paging messages during its active periods and the second SIM is configured to at least perform beam management operations during its active periods; means for monitoring a number of scheduled beam management operations of the second SIM skipped during the active periods of the radio transceiver allocated for the first SIM; means for determining, based on at least data from the performed beam management operations, a threshold value for the skipped beam management operations; and means for adjusting, in response to the number of the skipped beam management operations reaching the threshold value, allocation of the active periods of the radio transceiver between the first SIM and the second SIM.

According to an embodiment, the apparatus comprises: means for monitoring a number of scheduled paging occasions of the first SIM skipped during the active periods of the radio transceiver allocated for the second SIM.

According to an embodiment, the apparatus comprises: means for switching, during an active period of the first SIM, the radio transceiver of the apparatus to a communication in an active period of the second SIM so as to enable the second SIM to perform at least one beam management operation.

According to an embodiment, said means for switching are configured to switch the radio transceiver of the apparatus back to a communication in an active period of the first SIM after the second SIM having performed said at least one beam management operation.

According to an embodiment, the apparatus comprises: means for triggering, in response to the first SIM successfully decoding a paging message, an early termination of paging monitoring of the first SIM prior to said switching.

According to an embodiment, said means for triggering are configured to prevent a second early termination of the paging monitoring of the first SIM, if a first early termination of the paging monitoring of the first SIM has caused at least part of paging monitoring operations not to be completed.

According to an embodiment, said monitoring of the paging messages during the active periods of the first SIM comprise at least receiving one or more synchronization signal blocks (SSB) from one or more access nodes of the network.

According to an embodiment, said beam management operations comprise one or more of the following:
  measuring one or more channel state information reference signals (CSI-RS) from signals received from one or more access nodes of the network;

receiving one or more synchronization signal blocks (SSB) from one or more access nodes of the network;

send a measurement report of the received signals to one or more access nodes of the network.

According to an embodiment, data from the performed beam management operations comprises one or more of the following:

a period for re-alignment;
a period for switching beams;
reference signal received power (RSRP) of current beam;
a period for transition between synchronization signal blocks (SSB) in a current serving cell;
an estimation for handover periods.

According to an embodiment, the apparatus comprises means for determining a decision threshold for a quality of beam alignment of the second SIM; and means for evaluating the quality of beam alignment by comparing a latest measured or estimated reference signal received power (RSRP) to the decision threshold.

According to an embodiment, said means for monitoring a number of skipped beam management operations of the second SIM comprise a counter and/or a timer.

According to an embodiment, the apparatus is a Dual Sim Dual Standby (DSDS) device or a Multi USIM Multi Standby (MUMS) device.

According to an embodiment, at least the second SIM is configured to operate in a frequency band of millimeter waves (mmWave) of 3GPP 5G NR specifications.

An apparatus according to a second aspect comprises at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa, at least one processor and at least one memory, said at least one memory stored with computer program code thereon, the at least one memory and the computer program code configured to, with the at least one processor, cause the apparatus at least to perform: allocate a radio transceiver of the apparatus for a communication of the first SIM and the second SIM for alternative active periods, wherein the first SIM is configured to at least monitor paging messages during its active periods and the second SIM is configured to at least perform beam management operations during its active periods; monitor a number of scheduled beam management operations of the second SIM skipped during the active periods of the radio transceiver allocated for the first SIM; determine, based on at least data from the performed beam management operations, a threshold value for the skipped beam management operations; and adjust, in response to the number of the skipped beam management operations reaching the threshold value, allocation of the active periods of the radio transceiver between the first SIM and the second SIM.

A method according to a third aspect comprises: allocating, in an apparatus comprising at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa, a radio transceiver of the apparatus for a communication of the first SIM and the second SIM for alternative active periods, wherein the first SIM is configured to at least monitor paging messages during its active periods and the second SIM is configured to at least perform beam management operations during its active periods; monitoring a number of scheduled beam management operations of the second SIM skipped during the active periods of the radio transceiver allocated for the first SIM; determining, based on at least data from the performed beam management operations, a threshold value for the skipped beam management operations; and adjusting, in response to the number of the skipped beam management operations reaching the threshold value, allocation of the active periods of the radio transceiver between the first SIM and the second SIM.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the beam management operations. While the following focuses on dual-SIM/MUSIM devices in 5G networks, the embodiments as described further below are by no means limited to be implemented in said networks only, but they are applicable in any network supporting beam management operations, such as in 4G/LTE networks.

Figure 1:
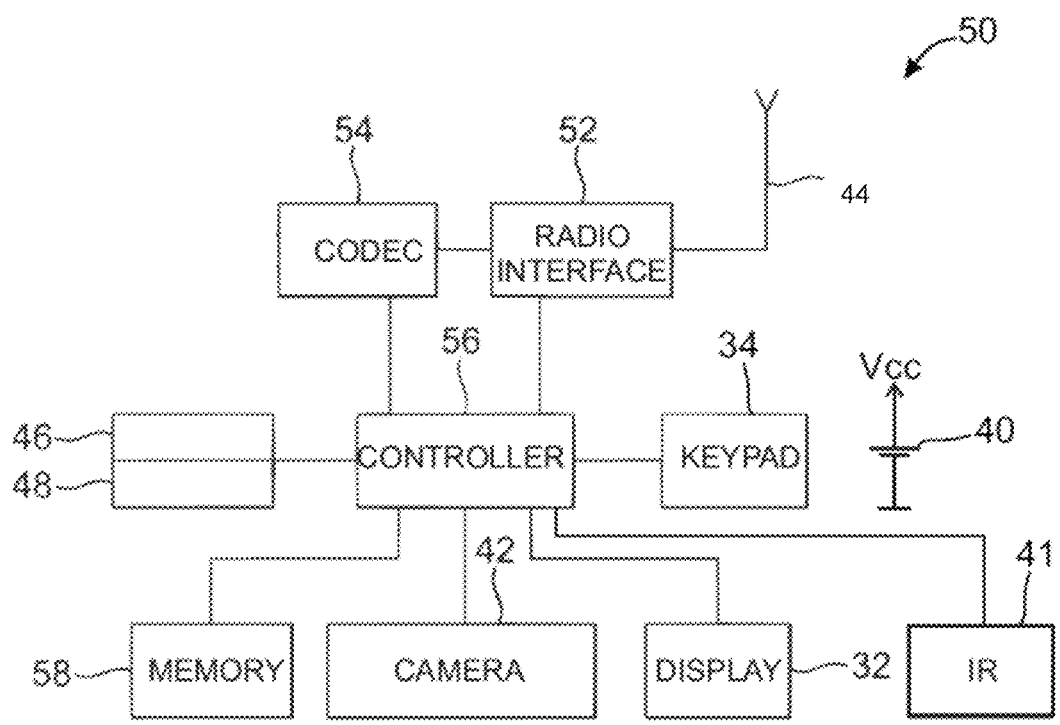
FIG. 1 shows a schematic block diagram of an apparatus for incorporating a dual-SIM/MUSIM arrangement according to the embodiments.
Figure 2:
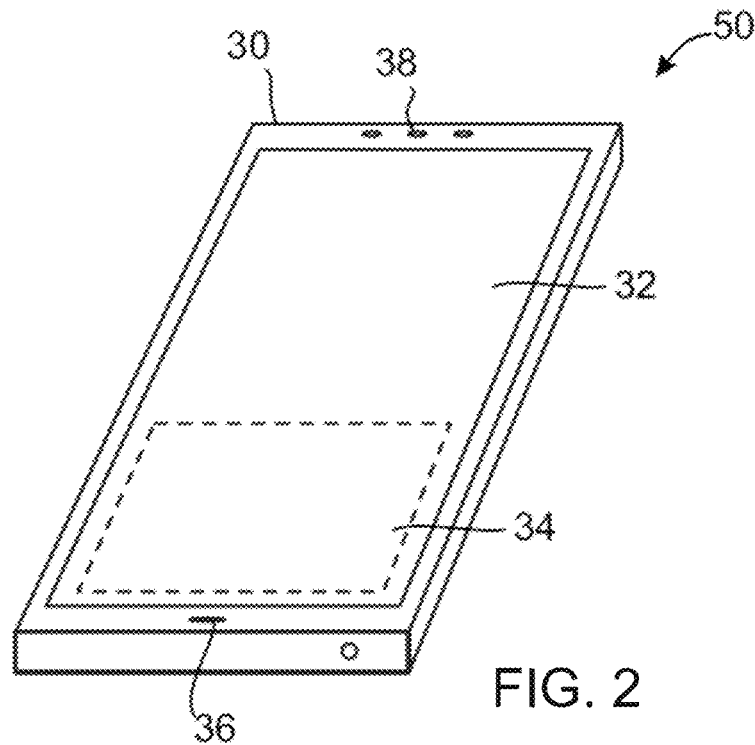
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the dual-SIM/MUSIM arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

For implementing the dual-SIM/MUSIM functionality, the apparatus 50 may further comprise a first card reader 46 and a second card reader 48, which may be supplied with a first subscriber identity module (SIM/USIM) associated with a first network and a second SIM/USIM associated with a second network, respectively, for providing user information and being suitable for providing authentication information for authentication and authorization of the user at the first network and the second network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In an apparatus operating according to DSDS principle, the first card reader 46 and the second card reader 48, and consequently the first SIM associated with the first network and the second SIM associated with the second network, are configured to use the radio interface circuitry 52 and the antenna 44 in alternating manner: while both SIMs may be capable of receiving paging messages from their associated networks, only either of the SIMs may originate or terminate a communication (e.g., a voice call or data call). The apparatus may comprise switching means for switching the radio interface circuitry 52 and the antenna 44 for use of the first SIM and the second SIM in alternating manner.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Regarding the NR/5G networks, the requirements for the support of Multi USIM devices is described in 3GPP TR 22.834 more in detail. Therein, for example the operation of a UE according to the DSDS principle is addressed, where a multi-USIM device implementation uses common radio and baseband components that are shared among the multiple USIMs. For example, while actively communicating with the first system associated with USIM A, the UE needs to occasionally check the other system associated with USIM B, e.g. to monitor the paging channel, perform signal measurements, or read the system information, and determine if it needs to respond to a paging request from the other system. While both USIMs may be capable of receiving page messages from their associated networks, only either of the USIMs may originate or terminate a communication (e.g., a voice call or data call).

3GPP considers two cases for MUSIM devices, one where the multiple USIMs are associated with different operators (Mobile Network Operator (MNO)) and another where the USIMs are associated with the same operator. It is noted that even if the USIMs of the UE were associated with different operators, they may nevertheless use the same underlying network (PLMN) e.g. in a situation, where one of the operators is a so-called virtual operator (MNVO) hiring network capacity from a network of another operator. In the following, the terms SIM and USIM are used interchangeably. SIM also may refer to the network subscription associated with the SIM, as well as to the protocol stack handling the network subscription associated with the SIM.

Figure 3:
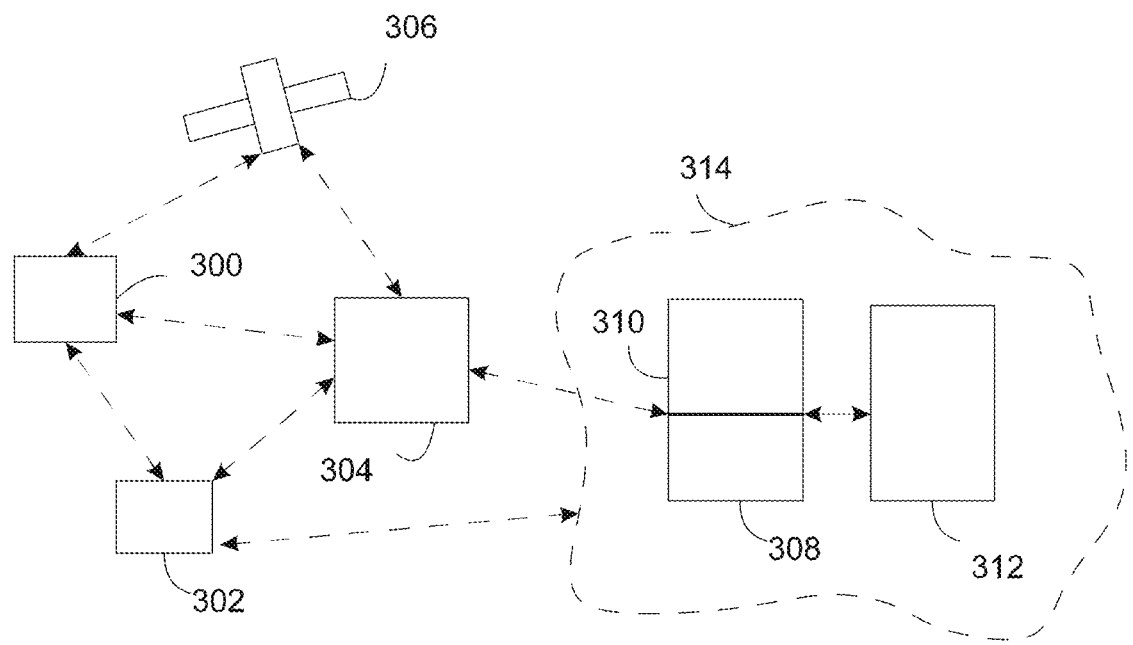
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

Figure 4:
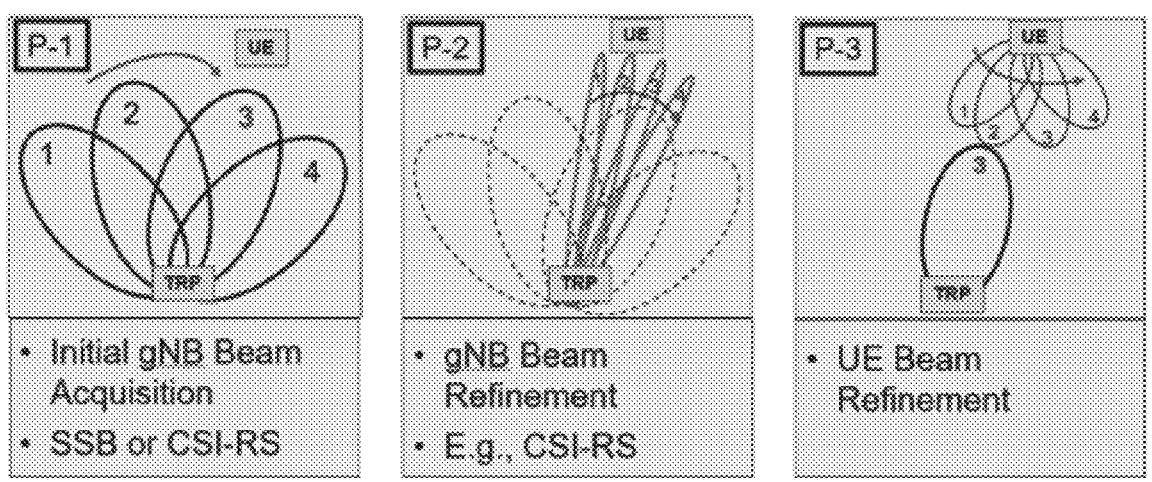
FIG. 4 shows a beam alignment procedure for 5G NR networks.

When the UE, or at least one SIM included in the UE, is operating in Frequency Range 2 (FR2), the radio beam alignment procedure between the gNB and the UE for both reception and transmission (Rx/Tx) includes the following steps with the corresponding phases P-1, P-2 and P-3 identified in FIG. 4:

a) the gNB transmitting reference signals in different directions using different Tx beams (P-1 and P-2);
b) the UE providing feedback on the best gNB beam (P-1 and P-2);
c) the UE transmitting reference signals in different directions using different Tx beam configurations (P-3);
d) the gNB providing feedback on the best UE beam (P-2 and P-3).

3GPP specifications define a 4-step RACH procedure and a 2-step RACH procedure (combining two messages of 4-step procedure into one) for RACH synchronization. The phases P-2 and P-3 in FR2 require further signalling exchanges that go beyond the 2-step RACH (even in the case of 4-step RACH). Furthermore, this procedure can be reiterated several times to increase the accuracy of the Rx/Tx beam between gNB and UE. However, with very narrow beams and, therefore, a large degree of freedom in the spatial domain, the Rx/Tx beam alignment procedure can be expensive in terms of both overhead, UE power, and latency, as it basically requires the transmission of probe signals in many directions at both ends of the communication link.

In Frequency Range 1 (FR1), beam forming is only used from the gNB perspective and the UE uses a single beam, wherein the Rx/Tx beam alignment procedure consists in phases P-1 and P-2.

Two main types of MUSIM devices are normally referred to depending on the supported simultaneous RRC_states on the USIMs.

Dual SIM Dual Standby (DSDS) or Multi USIM Multi Standby (MUMS): MUSIM devices which are registered with two or more independent subscriber IDs (USIMs) and can be in RRC_idle mode on all USIMs. However, only a single USIM may be on RRC_connected mode with at a given time.

Dual SIM Dual Active (DSDA) or Multi USIM Multi Active (MUMA): MUSIM devices which are registered with two or more independent subscriber IDs (USIMs) and can be in RRC_idle mode on all USIMs. Further, all USIMs may be maintained on RRC_connected mode activities, as well.

When a DSDS (or a MUMS) device must perform an operation in a first SIM (i.e. USIM 1), the device will have to pause the operation in the second SIM (i.e. USIM 2). In other words, the USIM 2 will not be able to access the radio transceiver parts, such as the RF/HW pathways, of the UE while USIM 1 is using said parts. The periods with no access to radio transceiver parts may be referred to as gaps or (RF) inactive periods, whereas the periods when a SIM has access to radio transceiver parts may be referred to as (RF) active periods.

If USIM 2 is operating in RRC Connected mode and USIM 1 is operating in RRC Idle/Inactive mode, the USIM 2 will lose temporarily access to the RF resources (or pathways) when the USIM 1 is performing the monitoring of the paging occasions. Therefore, the time duration of the USIM 2 temporarily losing access to the RF resources is equivalent to the duration of the monitoring of the paging occasion.

Figure 5A:
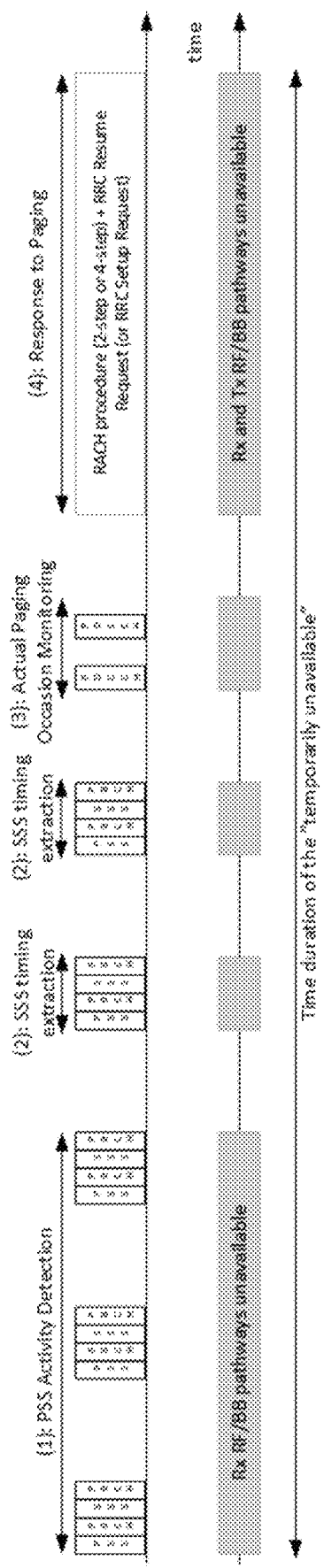
FIG. 5a shows an example of the time duration of a SIM temporarily losing its access to the RF resources in MUSIM devices.

This is illustrated in FIG. 5a, showing that the time when the radio frequency/baseband (RF/BB) pathways of the UE are blocked due to the paging monitoring is not only due to the actually paging occasion monitoring itself but also to the acquisition of downlink synchronization as well as eventual paging response. These different elements, depicted in FIG. 5a, include: (1) the extraction of the time that a device has to spend monitoring the other PLMN to detect the Primary Synchronization Signal (PSS activity detection), and (2) the number of synchronization signal blocks (SSBs) that the UE has to monitor to extract the timing synchronization (SSS timing extraction), (3) the actual paging occasion monitoring, and then finally (4) the paging response time (in case a paging message is present).

The duration of the PSS activity detection is connected to the current observed coverage conditions, i.e. the lower is the SNR experienced at the UE in connection to the PSS detection, the longer it will take for the PSS to be detected. While the duration of the paging response depends on the number of Physical Random Access Channel (PRACH) preamble power ramping attempts that are made, the occurrence of collisions and subsequent re-attempts and the eventual time for the network to provide a feedback to the UE.

For a USIM to be able to operate in FR2 in RRC Connected mode, said USIM must periodically perform beam management related operations, such as channel state information reference signals/synchronization signal blocks (CSI-RS/SSB) measurements, as well as to report periodically the result of these measurements to the network. In a DSDS device, the USIM in RRC Connected mode (USIM 2) will have to skip part of the CSI-RS/SSB measurements (and potentially the transmission of the associated reports), whenever these fall in the gap or inactive period introduced by the multi-SIM operation of the other USIM (e.g. in case USIM 1 has to monitor a paging occasion).

Figure 5B:
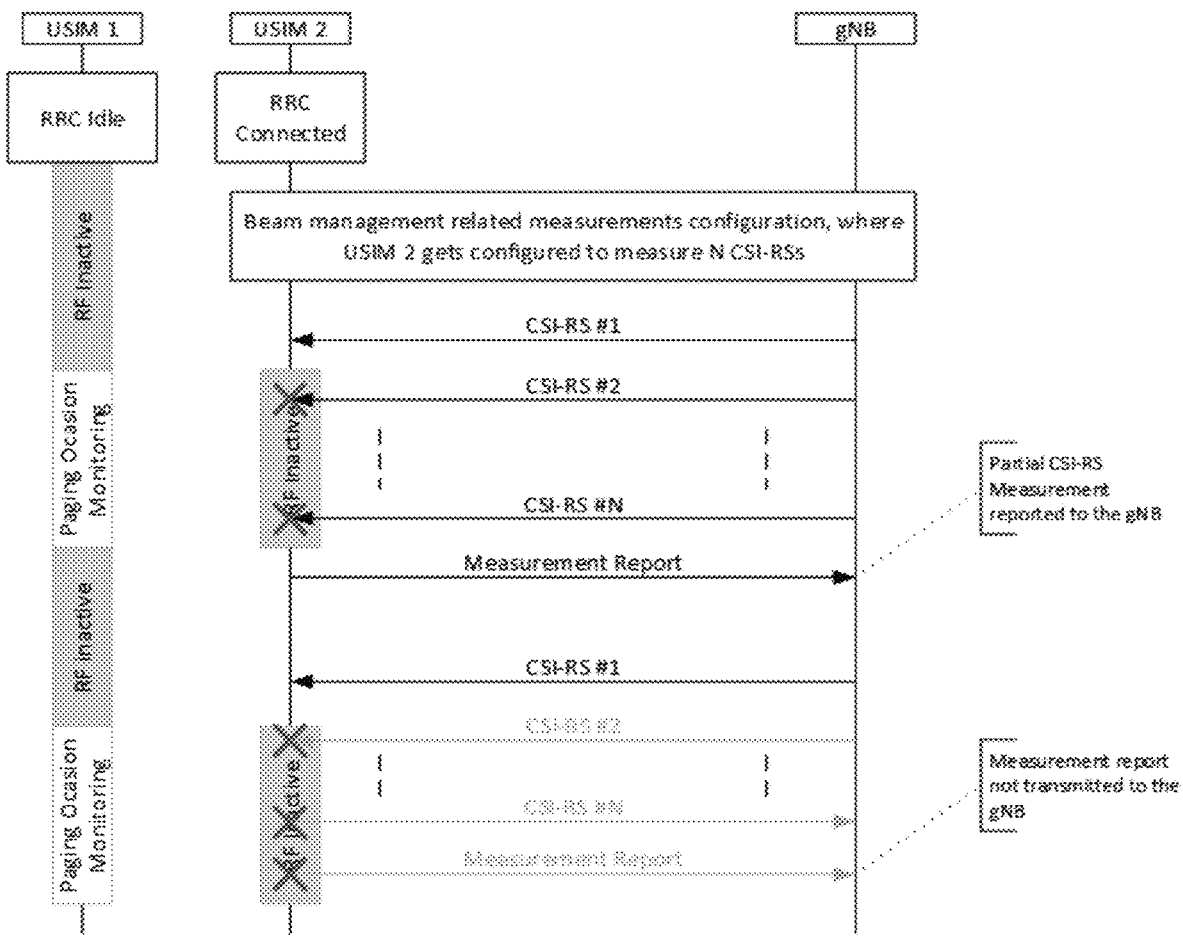
FIG. 5b shows an example of disruption in beam management procedure due to RF inactive periods in MUSIM devices.

This is illustrated in an example of FIG. 5b, where USIM1 is operating in RRC Idle mode and USIM2 is operating in RRC Connected mode. The radio transceiver parts, such as the RF/HW pathways, of the UE are allocated to USIM1 and USIM2 in alternating manner. Thus, the RF inactive periods take place for USIM1 and USIM2 in alternating manner, too. When USIM1 experiences an RF inactive period, USIM2 may start beam management related operations, such as CSI-RS measurements.

USIM2 manages to carry out only the first measurement CSI-RS #1 before the radio transceiver parts are allocated to USIM1 for enabling paging occasion monitoring. During its inactive period, USIM2 fails to carry out the following measurement CSI-RS #2, . . . , CSI-RS #N. When the radio transceiver parts are allocated back to USIM2, it only enables to send a partial CSI-RS measurement report to the gNB.

Again, for the next CSI-RS measurements sequence, USIM2 manages to carry out only the first measurement CSI-RS #1 and it also fails to send any CSI-RS measurement report to the gNB at a scheduled time due to an RF inactive period.

When a sufficient number of CSI-RS/SSB measurements (and reports) are lost, then the USIM in RRC Connected mode will lose its beam alignment and will need to start the beam failure recovery (BFR) procedure. This will require additional signalling overhead and will disrupt the normal operation of USIM 2 until beam alignment is re-established. Such disruption may take several 100 s of ms, as the phases P1, P2 and P3 have to be completed again.

This problem is further aggravated for devices experiencing high mobility, as the best beam changes rapidly, and hence skipping CSI-RS/SSB measurements (and reports) will increase significantly the probability of beam misalignment occurrence.

In the following, an enhanced method for allowing a UE to minimize the occurrence of beam misalignments and the associated USIM operation disruption will be described in more detail, in accordance with various embodiments.

Figure 6:
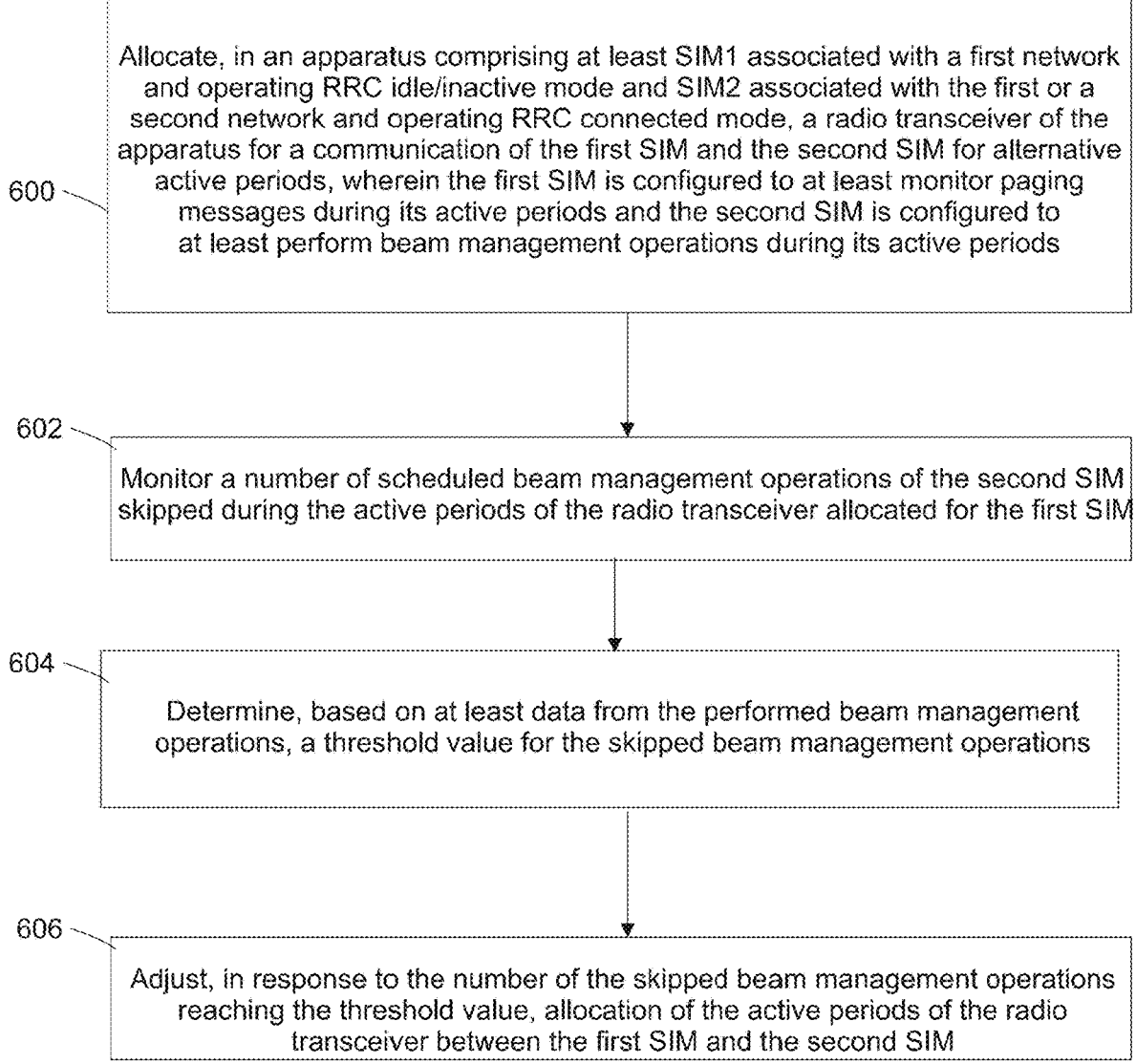
FIG. 6 shows a flow chart for a beam management procedure according to an embodiment.

The method, which is disclosed in FIG. 6 as reflecting the operation of a terminal apparatus, such as a user equipment (UE), comprising at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa, wherein the method comprises allocating (600) a radio transceiver of the apparatus for a communication of the first SIM and the second SIM for alternative active periods, wherein the first SIM is configured to at least monitor paging messages during its active periods and the second SIM is configured to at least perform beam management operations during its active periods; monitoring (602) a number of scheduled beam management operations of the second SIM skipped during the active periods of the radio transceiver allocated for the first SIM; determining (604), based on at least data from the performed beam management operations, a threshold value for the skipped beam management operations; and adjusting (606), in response to the number of the skipped beam management operations reaching the threshold value, allocation of the active periods of the radio transceiver between the first SIM and the second SIM.

Thus, the method enables a dual/multi-SIM UE to prioritize the use of its radio transceiver parts, such as the RF/HW pathways, between the two or more SIMs based on at least the beam alignment status of at least one SIM. For that purpose, the UE keeps track of scheduled beam management operations of the second SIM, which have been skipped due to the first SIM reserving the radio transceiver parts for its use. The UE uses the data from the previously performed beam management operations for determining a threshold value for the skipped beam management operations. It is noted that the threshold value may be dynamic, and it may be affected by many parameters, such as the current mobility conditions of the UE, previously measured beam alignment status, time elapsed from the latest measurement, etc. The threshold value may be expressed in a number of skipped beam management operations, whereupon when the number of the actually skipped beam management operations reaches the threshold value, it provides an indication that there is a risk of losing the beam alignment of the second SIM. Consequently, the allocation of the active periods of the radio transceiver between the first SIM and the second SIM may be adjusted for mitigating this risk and the UE may optimize its performance and leverage on the trade-off between beam alignment maintenance and paging occasion monitoring.

According to an embodiment, the method further comprises monitoring a number of scheduled paging occasions of the first SIM skipped during the active periods of the radio transceiver allocated for the second SIM. Thus, in addition to the skipped beam management operations of the second SIM, also the skipped paging occasions of the first SIM may be monitored, and this information may as well be used upon adjusting the allocation of the active periods of the radio transceiver between the first SIM and the second SIM.

It is noted that when the first SIM is operating in an idle or an inactive mode of RRC, it may perform, in addition to paging occasion monitoring, also other RRC_idle or RRC_inactive related operations. A detected need for performing any such operation may also provide information for adjusting the allocation of the active periods of the radio transceiver between the first SIM and the second SIM.

According to an embodiment, at least the second SIM is configured to operate in a frequency band of millimeter waves (mmWave) of 3GPP 5G NR specifications.

According to an embodiment, said beam management operations comprise one or more of the following:
  measuring one or more channel state information reference signals (CSI-RS) from signals received from one or more access nodes of the network;
  receiving one or more synchronization signal blocks (SSB) from one or more access nodes of the network;
  send a measurement report of the received signals to one or more access nodes of the network.

Thus, at least the beam management operations specified for the frequency range 1 (FR1) and the frequency range 2 (FR2) of the 5G NR networks may take place, thereby ensuring that the first SIM is operating in an idle or an inactive mode of RRC may carry out its paging occasion monitoring, as well as other RRC_idle or RRC_inactive related operations, and the second SIM operating in RRC connected mode in FR2 may carry out its beam management operations.

According to an embodiment, data from the performed beam management operations comprises one or more of the following:
  a period for re-alignment;
  a period for switching beams;
  reference signal received power (RSRP) of current beam;
  a period for transition between synchronization signal blocks (SSB) in a current serving cell;
  an estimation for handover periods.

Thus, data related to the robustness of the current beam alignment of the second SIM is gathered, as well as data associated with the mobility conditions of the UE. Both of these data may affect to the decision to adjust the allocation of the active periods of the radio transceiver between the first SIM and the second SIM.

According to an embodiment, said monitoring of the paging messages during the active periods of the first SIM comprise at least receiving one or more synchronization signal blocks (SSB) from one or more access nodes of the network.

Hence, knowing the structure and occurrence of a SSB sweep, information related to the paging occasions monitoring, such as a likelihood of receiving a paging message and a number of skipped paging occasions may be determined. Accordingly, the outcome of the monitoring of past paging occasions may be used upon deciding whether there is a need for adjusting the allocation of the active periods of the radio transceiver between the first SIM and the second SIM.

According to an embodiment, the method further comprises switching, during an active period of the first SIM, the radio transceiver of the apparatus to a communication in an active period of the second SIM so as to enable the second SIM to perform at least one beam management operation. Thus, when the UE monitors paging occasions for the first SIM, the UE may decide, based on the data from the previously performed beam management operations, to momentarily switch the radio transceiver parts, such as the RF/HW pathways, from the first SIM operating in RRC Idle/Inactive mode to the second SIM operating in RRC Connected mode in order to allow the second SIM to perform at least one beam management operation.

According to an embodiment, the radio transceiver of the apparatus is configured to be switched back to a communication in an active period of the first SIM after the second SIM having performed said at least one beam management operation. Hence, it may only be required that the second SIM performs one or few signal measurements and/or transmits an associated report to a gNB, where after the radio transceiver of the apparatus may be resumed for the communication of the first SIM, which may continue e.g. the paging occasion monitoring.

According to an embodiment, the method further comprises triggering, in response to the first SIM successfully decoding a paging message, an early termination of paging monitoring of the first SIM prior to said switching. Thus, in a situation where the first SIM monitors the paging occasions and manages to decode a paging message during an early stage of its active period, the UE may be configured to trigger an early termination of the paging monitoring process of the first SIM and force the radio transceiver of the apparatus to be switched to a communication in an active period of the second SIM so as to enable the second SIM to perform at least one beam management operation. Especially, when operating in FR2, where the UE conventionally waits for the SSB sweep to complete, the UE may trigger the early termination of the paging monitoring process of the first SIM a soon as the first SIM receives an SSB strong enough for decoding the associated paging information.

Figure 7:
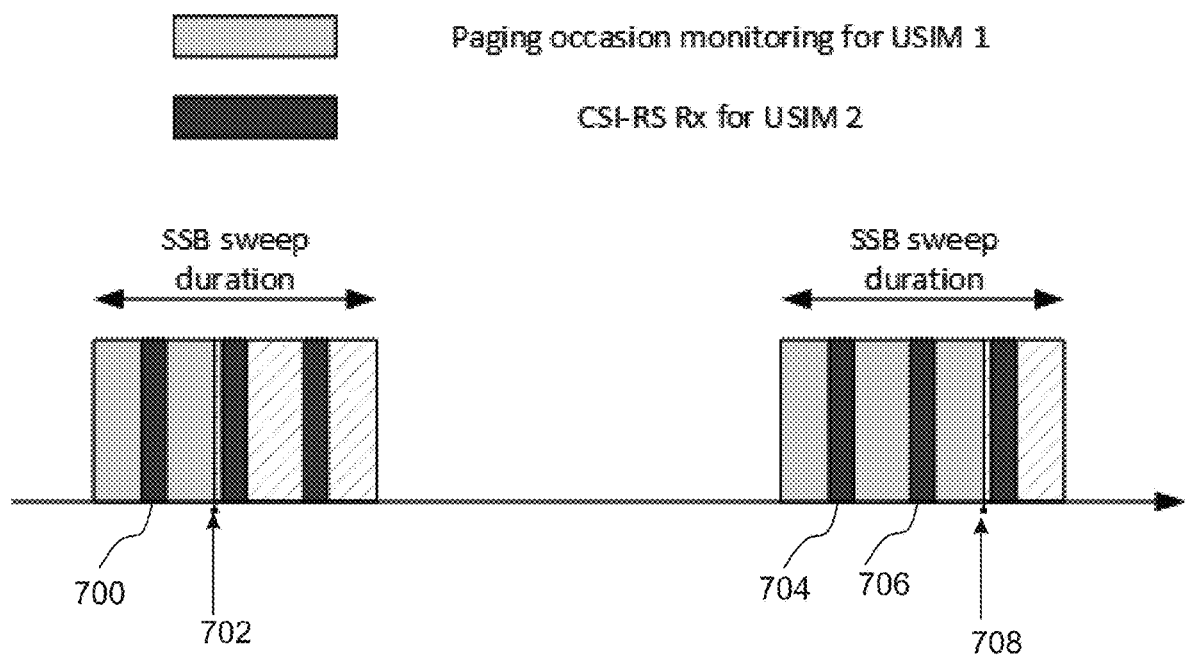
FIG. 7 shows an exemplified SSB sweep period for illustrating some embodiments.

FIG. 7 illustrates the above embodiments by showing an exemplified SSB sweep period having its duration divided in time slots, which are alternatingly allocated for paging occasion monitoring for the first SIM and channel state information reference signal (CSI-RS) reception for the second SIM, thereby alternating the active periods of the first SIM and the second SIM, correspondingly. For making the decision whether there is a need for the second SIM to perform at least one beam management operation, the time slots allocated for the CSI-RS reception for the second SIM are the points for evaluating the need.

For example, during the first SSB sweep of FIG. 7, time slot 700 may provide information, based on the data from the beam management operations, that the second SIM should perform at least one beam management operation. On the other hand, at point 702 the first SIM has acquired sufficient paging information, and an early termination of paging monitoring of the first SIM may be forced. Thus, the remaining time slots of the first SSB sweep may be allocated for the second SIM for performing one or more beam management operations.

Similarly, during the second SSB sweep of FIG. 7, either of time slots 704, 706 may provide information, based on the data from the beam management operations, that the second SIM should perform at least one beam management operation. In the second SSB sweep, the first SIM has acquired sufficient paging information at point 708, after which point an early termination of paging monitoring of the first SIM may be forced. Again, the time slots of the first SSB sweep after the point 708 may be allocated for the second SIM for performing one or more beam management operations.

According to an embodiment, a second early termination of the paging monitoring of the first SIM is configured to be prevented, if a first early termination of the paging monitoring of the first SIM has caused at least part of paging monitoring operations not to be completed. Thus, if the UE has previously performed an early termination of the paging monitoring, it may have not obtained e.g. the state of all SSB beams associated with the PLMN of the first SIM and/or sent an associated report to a gNB. Thus, the UE may choose to not perform a subsequent early termination so as to enable to complete the missing paging monitoring operations.

According to an embodiment, the method further comprises determining a decision threshold for a quality of beam alignment of the second SIM; and evaluating the quality of beam alignment by comparing a latest measured or estimated reference signal received power (RSRP) to the decision threshold. Thus, the UE may use the latest measured CSI-RS/SSB strength in case the previous beam measurements indicate that the beamformed channel is stationary. The UE may also predict the missed CSI-RS/SSB strength based on the previous measurements. The decision threshold can be adapted based on the mobility, becoming more strict (higher threshold) for higher mobility and less strict (lower threshold) lower mobility. The comparison of measured or estimated RSRP value to the decision threshold may be used to decide if the beam alignment is entering a critical stage.

According to an embodiment, the means for monitoring a number of skipped beam management operations of the second SIM comprise a counter and/or a timer. Accordingly, the timing schedule and the number of the beam management operations, such as the CSI-RS measurements, is typically predetermined and known by the UE. Thus, upon starting a beam management operation, the UE may start a counter and/or a timer, and based on the number of received CSI-RS signals from the gNB and/or the elapsed time, the UE may count the number of skipped beam management operations, such as non-received CSI-RS signals.

According to an embodiment, the apparatus is a Dual Sim Dual Standby (DSDS) device or a Multi USIM Multi Standby (MUMS) device. The advantages of the embodiments are evident in DSDS/MUMS devices having only one radio transceiver parts, such as the RF/HW pathways, which are alternatingly allocated between the two or more SIMs. However, the embodiments are not limited to DSDS/MUMS devices only, but they can equally be implemented in DSDA/MUMA devices, as well.

In the following, various embodiments will be described using examples relating to 5G networks. It is, however, noted that the method and the embodiments are applicable in any network supporting the dual/multi-SIM UEs, such as in 4G/LTE networks.

Figure 8:
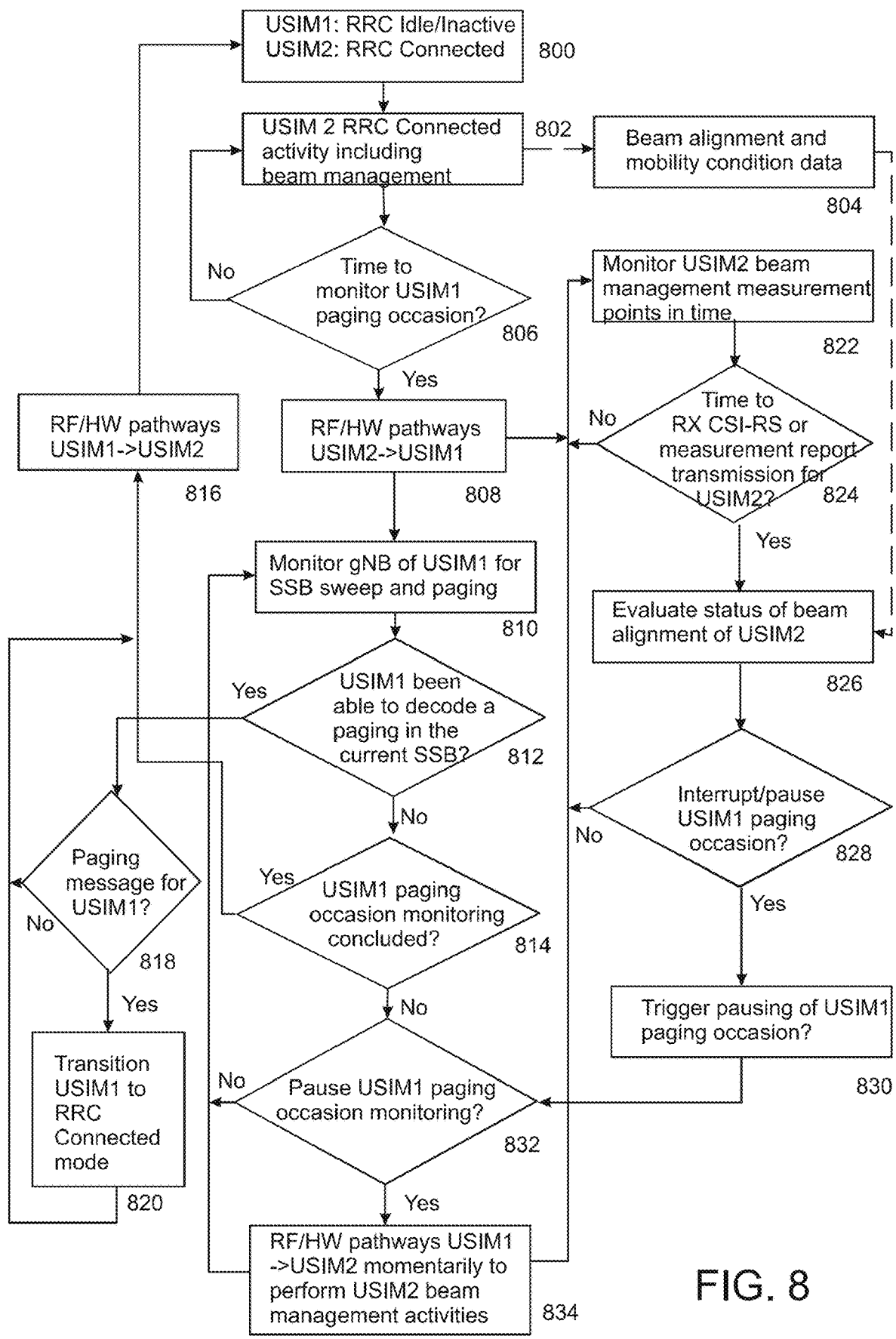
FIG. 8 shows a flow chart for a beam management procedure in a user equipment according to an embodiment.

The flow chart of FIG. 8 illustrates the method and various embodiments related thereto. It is noted that the numerals of the flow chart do not necessary reflect the actual order of events, but the events may take place in different order or in parallel. The starting point in the process is that the USIMs in the UE each transition to their respective state (800). USIM 1 transitions to RRC Idle/Inactive state in FR1 or FR2, while USIM 2 transitions to RRC Connected state in FR2. USIM 1 may also be operating even in other non-NR cellular system.

The USIM 2 performs RRC Connected activities (802), which includes beam management in the form of CSI-RS measurements and the associated reports. Based on the measurements, the UE collects data (804) associated with the robustness of the current beam alignment of USIM 2 (e.g. how often re-alignment is required, how often is the UE instructed to switch beams, what is the RSRP of the current beam according with the last received N CSI-RS), and the mobility conditions of the device (e.g. how often the UE transitions between SSBs within the serving cell, how often an handover occurs).

The UE checks (806) if it is time to start monitoring the paging occasion associated with USIM 1: if no, the UE continues to perform RRC Connected activities (802), if yes, the UE switches (808) the RF/HW pathways of the UE from USIM 2 to USIM 1. The UE starts to monitor (810) the gNB downlink transmissions associated with the PLMN of USIM 1 for the gNB's SSB sweep, with the goal of decoding the paging message.

The UE checks (812) if USIM 1 has been able to decode paging message: if no, the UE checks (814), if the paging occasion monitoring has concluded, i.e. whether USIM 1 has finished monitoring all SSBs within the SSB sweep. If yes, the UE switches (816) the RF/HW pathways of the UE from USIM 1 to USIM 2, and starts the process from beginning (steps 800 and 802). If in step 812 USIM 1 has been able to decode paging message, USIM 1 checks (818) if the USIM 1 is identified as a recipient of the paging message, i.e. if the USIM 1 identity is present in the paging record: if yes, USIM 1 transitions from RRC Idle/Inactive to RRC Connected mode (820) as instructed in the paging record; if no, the UE switches (816) the RF/HW pathways of the UE from USIM 1 to USIM 2, and starts the process from beginning (steps 800 and 802).

The following steps 822-830 and the actions related thereto are performed at least partly parallel with the above-described steps. After the UE having switched (808) the RF/HW pathways of the UE from USIM 2 to USIM 1, the UE continues to keep track (822) of the USIM 2 beam management measurement and report points in time. The UE may periodically check (824), if a CSI-RS measurement or a report transmission associated with the beam alignment for USIM 2 is scheduled to be performed: if no, the UE continues to keep track (822) of the USIM 2 beam management measurement and report points in time; if yes, the UE evaluates (826) the quality of the beam alignment of USIM 2.

The UE may use the data associated with the robustness of the current beam alignment of USIM 2 and the mobility conditions of the UE gathered in step 804. The evaluation may be carried out by, e.g., comparing the trend of the RSRP associated with the last received N CSI-RS with a decision threshold to decide if the beam alignment is entering a critical stage. The decision threshold can be adapted based on the mobility, becoming more strict (higher threshold) for higher mobility and less strict (lower threshold) lower mobility.

The UE checks (828) if the conditions are met to interrupt/pause paging occasion (or other activity) monitoring of the USIM 1: if no, the UE continues to keep track (822) of the USIM 2 beam management measurement and report points in time; if yes, the UE triggers (830) the pausing of USIM 1 paging occasion monitoring (or other related activity). The UE may trigger an interruption signal to be used as a response to the UE noticing (814) that the paging occasion monitoring for USIM 1 has not yet finished. The triggered interruption signal is waiting for the execution of steps 800-820 to reach it.

Thus, before concluding the paging occasion monitoring for USIM 1, the UE checks (832), if there is a triggered interruption signal: if no, UE continues to monitor (810) the gNB downlink transmissions associated with the PLMN of USIM 1 for the gNB's SSB sweep, if yes, the UE switches (834) the RF/HW pathways of the UE from USIM 1 to USIM 2 at least momentarily, such as for N slots, in order to perform USIM 2 beam management activities (i.e. receive CSI-RS and/or transmit measurements reports to the USIM2 associate gNB). After the N slots have elapsed, the RF and hardware pathways are switched back to USIM 1.

An apparatus according to an aspect of the invention is arranged to implement the method as described above, and possibly one or more of the embodiments related thereto. Thus, the apparatus, such as the apparatus depicted in FIG. 1, comprises at least a first subscriber identity module (SIM) associated with a first network and a second SIM associated with the first network or a second network, wherein the first SIM is configured to operate in an idle or an inactive mode of a radio resource control protocol (RRC) while the second SIM configured to operate in a connected mode of the RRC and vice versa; means for allocating a radio transceiver of the apparatus for a communication of the first SIM and the second SIM for alternative active periods, wherein the first SIM is configured to at least monitor paging messages during its active periods and the second SIM is configured to at least perform beam management operations during its active periods; means for monitoring a number of scheduled beam management operations of the second SIM skipped during the active periods of the radio transceiver allocated for the first SIM; means for determining, based on at least data from the performed beam management operations, a threshold value for the skipped beam management operations; and means for adjusting, in response to the number of the skipped beam management operations reaching the threshold value, allocation of the active periods of the radio transceiver between the first SIM and the second SIM.

According to an embodiment, the apparatus comprises means for monitoring a number of scheduled paging occasions of the first SIM skipped during the active periods of the radio transceiver allocated for the second SIM.

According to an embodiment, the apparatus comprises means for switching, during an active period of the first SIM, the radio transceiver of the apparatus to a communication in an active period of the second SIM so as to enable the second SIM to perform at least one beam management operation.

According to an embodiment, said means for switching are configured to switch the radio transceiver of the apparatus back to a communication in an active period of the first SIM after the second SIM having performed said at least one beam management operation.

According to an embodiment, the apparatus comprises means for triggering, in response to the first SIM successfully decoding a paging message, an early termination of paging monitoring of the first SIM prior to said switching.

According to an embodiment, said means for triggering are configured to prevent a second early termination of the paging monitoring of the first SIM, if a first early termination of the paging monitoring of the first SIM has caused at least part of paging monitoring operations not to be completed.

According to an embodiment, said monitoring of the paging messages during the active periods of the first SIM comprise at least receiving one or more synchronization signal blocks (SSB) from one or more access nodes of the network.

According to an embodiment, said beam management operations comprise one or more of the following:
  measuring one or more channel state information reference signals (CSI-RS) from signals received from one or more access nodes of the network;
  receiving one or more synchronization signal blocks (SSB) from one or more access nodes of the network;
  sending a measurement report of the received signals to one or more access nodes of the network.

According to an embodiment, data from the performed beam management operations comprises one or more of the following:
  a period for re-alignment;
  a period for switching beams;
  reference signal received power (RSRP) of current beam;

a period for transition between synchronization signal blocks (SSB) in a current serving cell;
an estimation for handover periods.

According to an embodiment, the apparatus comprises means for determining a decision threshold for a quality of beam alignment of the second SIM; and means for evaluating the quality of beam alignment by comparing a latest measured or estimated reference signal received power (RSRP) to the decision threshold.

According to an embodiment, said means for monitoring a number of skipped beam management operations of the second SIM comprise a counter and/or a timer.

According to an embodiment, the apparatus is a Dual Sim Dual Standby (DSDS) device or a Multi USIM Multi Standby (MUMS) device.

According to an embodiment, at least the second SIM is configured to operate in a frequency band of millimeter waves (mmWave) of 3GPP 5G NR specifications.

An apparatus according to a further aspect comprises at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa, at least one processor and at least one memory, said at least one memory stored with computer program code thereon, the at least one memory and the computer program code configured to, with the at least one processor, cause the apparatus at least to perform: allocate a radio transceiver of the apparatus for a communication of the first SIM and the second SIM for alternative active periods, wherein the first SIM is configured to at least monitor paging messages during its active periods and the second SIM is configured to at least perform beam management operations during its active periods; monitor a number of scheduled beam management operations of the second SIM skipped during the active periods of the radio transceiver allocated for the first SIM; determine, based on at least data from the performed beam management operations, a threshold value for the skipped beam management.

A further aspect relates to a computer program product, stored on a non-transitory memory medium, comprising computer program code, which when executed by at least one processor, causes an apparatus at least to perform: allocate a radio transceiver of the apparatus for a communication of the first SIM and the second SIM for alternative active periods, wherein the first SIM is configured to at least monitor paging messages during its active periods and the second SIM is configured to at least perform beam management operations during its active periods; monitor a number of scheduled beam management operations of the second SIM skipped during the active periods of the radio transceiver allocated for the first SIM; determine, based on at least data from the performed beam management operations, a threshold value for the skipped beam management.

Another aspect relates to the operation of a base station or an access point, such as a gNB, for controlling the maximum allowable number of skipped paging occasion monitoring, CSI-RS Rx measurements and/or transmission of measurement reports. In the above embodiments, the UE keeps track of, or at least evaluates the skipped operations and controls the allocation of the active periods of the radio transceiver between the first SIM and the second SIM accordingly. In another aspect, said controlling of the number of allowed paging occasion monitoring, skipped CSI-RS Rx measurements and/or transmission of measurement reports may be performed via network configuration, wherein an access point or a base station of a radio access network, such as an eNB or a gNB, carries out the delivery of this information to the UE, for example, via broadcasted network configuration via a System Information Block (SIB) type, or via dedicated configuration via RRC Reconfiguration messages exchanges.

Figure 9:
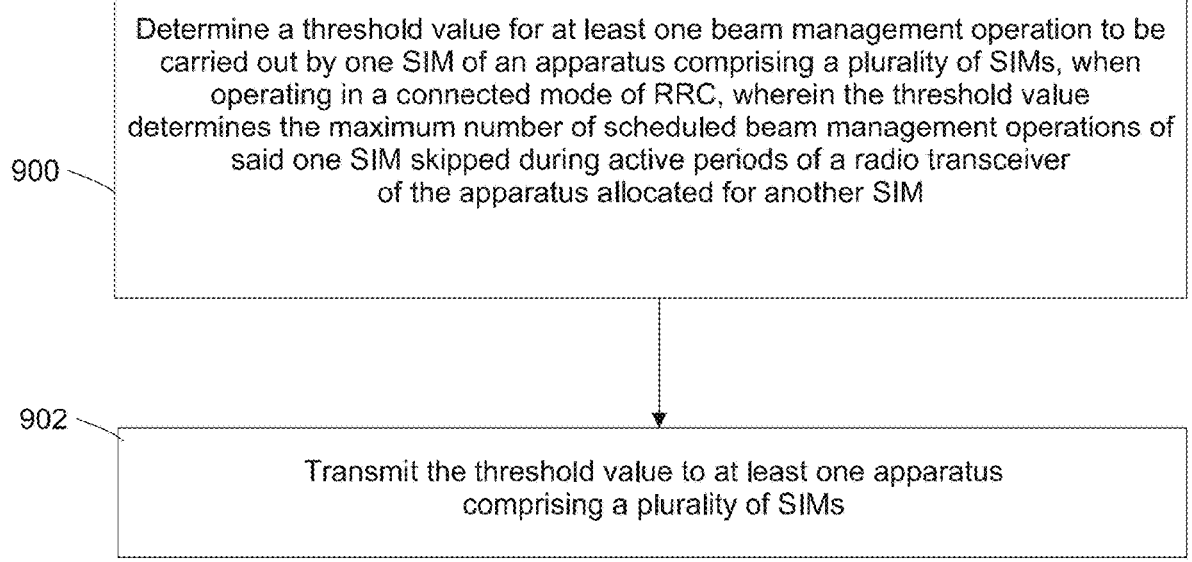
FIG. 9 shows a flow chart for controlling the number of skipped beam management operations in a network element according to an embodiment.

The flow chart of FIG. 9 illustrates a method carried out by a base station, wherein the method comprises determining (900) a threshold value for at least one beam management operation to be carried out by one subscriber identity module (SIM) of an apparatus comprising a plurality of SIMs, when operating in a connected mode of a radio resource control protocol (RRC), wherein the threshold value determines the maximum number of scheduled beam management operations of said one SIM skipped during active periods of a radio transceiver of the apparatus allocated for another SIM; and transmitting (902) the threshold value to at least one apparatus comprising a plurality of SIMs.

Hence, the network may provide a DSDS/MUSIM device with a threshold value for one or more skipped beam management operations, such as the number of allowed paging occasion monitoring, skipped CSI-RS Rx measurements and/or transmission of measurement reports. Thereby, instead of the user equipment trying to optimize the threshold value, e.g. based on the data from the previously performed beam management operations, the network forces the user equipment to use the predetermined one or more thresholds. The network may thus aim to ensure that the number of skipped beam management operations, possibly leading to the loss of the beam, does not raise too high. The network may send, via the base station, the same threshold value(s) to a plurality of DSDS/MUSIM devices. Therein, the information about the threshold value(s) may be provided via broadcasted network configuration, such as via any suitable System Information Block (SIB) type. Alternatively, the network may send, via the base station, device-specific threshold value(s) to a particular DSDS/MUSIM device. Therein, the information about the threshold value(s) may be provided via dedicated configuration, such as via RRC Reconfiguration messages exchanges.

The method and the embodiments related thereto may be implemented in an apparatus implementing an access point or a base station of a radio access network, such as an eNB or a gNB. The apparatus may comprise at least one processor and at least one memory, said at least one memory stored with computer program code thereon, the at least one memory and the computer program code configured to, with the at least one processor, cause the apparatus at least to perform: determine a threshold value for at least one beam management operation to be carried out by one subscriber identity module (SIM) of an apparatus comprising a plurality of SIMs, when operating in a connected mode of a radio resource control protocol (RRC), wherein the threshold value determines the maximum number of scheduled beam management operations of said one SIM skipped during active periods of a radio transceiver of the apparatus allocated for another SIM; and transmitting the threshold value to at least one apparatus comprising a plurality of SIMs Such an apparatus may likewise comprise: means for determining a threshold value for at least one beam management operation to be carried out by one subscriber identity module (SIM) of an apparatus comprising a plurality of SIMS, when operating in a connected mode of a radio resource control protocol (RRC), wherein the threshold value determines the maximum number of scheduled beam management operations of said one SIM skipped during active periods of a radio transceiver of the apparatus allocated for another SIM; and means for transmitting the threshold value to at least one apparatus comprising a plurality of SIMS.

According to an embodiment, said means for transmitting the threshold value is configured to transmit at least one same threshold value to a plurality of apparatus comprising a plurality of SIMs.

According to an embodiment, said means for transmitting the threshold value is configured to transmit at least one apparatus-specific threshold value to said at least one apparatus comprising a plurality of SIMS.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa;
at least one processor; and
at least one memory including computer program code; the at least one memory and the computer program code configured to cause the apparatus at least to:
allocate a radio transceiver of the apparatus for a communication of the first SIM and the second SIM for alternative active periods, wherein the first SIM is configured to at least monitor paging messages during its active periods and the second SIM is configured to at least perform beam management operations during its active periods;
monitor a number of scheduled beam management operations of the second SIM actually skipped during the active periods of the radio transceiver allocated for the first SIM;
determine, based on at least data from the performed beam management operations, a threshold value for the skipped beam management operations; and
adjust, in response to the number of the skipped beam management operations reaching the threshold value, allocation of the active periods of the radio transceiver between the first SIM and the second SIM.

2. The apparatus according to claim 1, wherein the at least one processor and the computer program code are configured to further cause the apparatus to:
monitor a number of scheduled paging occasions of the first SIM skipped during the active periods of the radio transceiver allocated for the second SIM.

3. The apparatus according to claim 1, wherein the at least one processor and the computer program code are configured to further cause the apparatus to:
switch, during an active period of the first SIM, the radio transceiver of the apparatus to a communication in an active period of the second SIM so as to enable the second SIM to perform at least one beam management operation.

4. The apparatus according to claim 3, wherein the at least one processor and the computer program code configured to cause the apparatus to switch comprise the at least one processor and the computer program code configured to cause the apparatus to:
switch the radio transceiver of the apparatus back to a communication in an active period of the first SIM after the second SIM having performed said at least one beam management operation.

5. The apparatus according to claim 3, wherein the at least one processor and the computer program code are configured to further cause the apparatus to:
trigger, in response to the first SIM successfully decoding a paging message, an early termination of paging monitoring of the first SIM prior to said switching.

6. The apparatus according to claim 5, wherein the at least one processor and the computer program code are configured to cause the apparatus to trigger comprise the at least one processor and the computer program code configured to cause the apparatus to:
prevent a second early termination of the paging monitoring of the first SIM, if a first early termination of the paging monitoring of the first SIM has caused at least part of paging monitoring operations not to be completed.

7. The apparatus according to claim 1, wherein the at least one processor and the computer program code configured to cause the apparatus to monitor of the paging messages during the active periods of the first SIM comprise the at least one processor and the computer program code configured to cause the apparatus to:
receive one or more synchronization signal blocks (SSB) from one or more access nodes of the network.

8. The apparatus according to claim 1, wherein said beam management operations comprise one or more of the following:

measuring one or more channel state information reference signals (CSI-RS) from signals received from one or more access nodes of the network;

receiving one or more synchronization signal blocks (SSB) from one or more access nodes of the network;

send a measurement report of the received signals to one or more access nodes of the network.

9. The apparatus according to claim 8, wherein data from the performed beam management operations comprises one or more of the following:

a period for re-alignment;

a period for switching beams;

reference signal received power (RSRP) of current beam;

a period for transition between synchronization signal blocks (SSB) in a current serving cell;

an estimation for handover periods.

10. The apparatus according claim 1, wherein the at least one processor and the computer program code are configured to further cause the apparatus to:

determine a decision threshold for a quality of beam alignment of the second SIM; and evaluate the quality of beam alignment by comparing a latest measured or estimated reference signal received power (RSRP) to the decision threshold.

11. The apparatus according to claim 1, further comprising a counter and/or a timer, wherein the at least one processor and the computer program code is configured to use the counter and/or the timer to monitor the number of skipped beam management operations of the second SIM.

12. The apparatus according to claim 1, wherein the apparatus is a Dual Sim Dual Standby (DSDS) device or a Multi USIM Multi Standby (MUMS) device.

13. The apparatus according to claim 1, wherein at least the second SIM is configured to operate in a frequency band of millimeter waves (mmWave) of 3GPP 5G NR specifications.

14. A method comprising:

allocating, in an apparatus comprising at least a first subscriber identity module (SIM) associated with a first network and a second SIM associated with the first or a second network, wherein the first SIM is configured to operate in an idle or an inactive mode of a radio resource control protocol (RRC) while the second SIM configured to operate in a connected mode of the RRC and vice versa, a radio transceiver of the apparatus for a communication of the first SIM and the second SIM for alternative active periods, wherein the first SIM is configured to at least monitor paging messages during its active periods and the second SIM is configured to at least perform beam management operations during its active periods;

monitoring a number of scheduled beam management operations of the second SIM actually skipped during the active periods of the radio transceiver allocated for the first SIM;

determining, based on at least data from the performed beam management operations, a threshold value for the skipped beam management operations; and adjusting, in response to the number of the skipped beam management operations reaching the threshold value, allocation of the active periods of the radio transceiver between the first SIM and the second SIM.

\* \* \* \* \*